(12) United States Patent
Smith et al.

(10) Patent No.: US 10,592,808 B2
(45) Date of Patent: *Mar. 17, 2020

(54) PREDICTIVE MODEL SCORING TO OPTIMIZE TEST CASE ORDER IN REAL TIME

(71) Applicant: International Business Machines Corporation, Armonk, NY (US)

(72) Inventors: Kevin B. Smith, Eastleigh (GB); Andrew J. Thompson, London (GB); David R. Waddling, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 833 days.

This patent is subject to a terminal disclaimer.

(21) Appl. No.: 15/287,247

(22) Filed: Oct. 6, 2016

(65) Prior Publication Data
US 2017/0017893 A1   Jan. 19, 2017

Related U.S. Application Data

(63) Continuation of application No. 15/014,486, filed on Feb. 3, 2016, now Pat. No. 9,495,642, which is a (Continued)

(51) Int. Cl.
*G06N 7/00* (2006.01)
*G06N 5/02* (2006.01)
(Continued)

(52) U.S. Cl.
CPC ........... *G06N 5/022* (2013.01); *G06F 11/261* (2013.01); *G06F 11/3664* (2013.01); (Continued)

(58) Field of Classification Search
CPC ...................................................... G06N 7/005
(Continued)

(56) References Cited

U.S. PATENT DOCUMENTS 7,178,063 B1   2/2007   Smith
7,840,844 B2   11/2010   Garland et al.
(Continued)

FOREIGN PATENT DOCUMENTS

CN   101908020 B   5/2012
CN   102253889 B   2/2014
WO   2014049104 A1   4/2014

OTHER PUBLICATIONS

Feldt et al ("Supporting Software Decision Meetings: Heatmaps for Visualising Test and Code Measurements" 2013) (Year: 2013).*
(Continued)

*Primary Examiner* — Lut Wong
(74) *Attorney, Agent, or Firm* — Gilbert Harmon, Jr.

(57) ABSTRACT

An approach for predictively scoring test case results in real-time. Test case results associated with a test run are received by a software testing environment. Using predictive statistical models, test case results and attribute relationships are matched against model rules and test case history. A statistical correlation and confidence parameter provide the ability to generate test case relationships for predicting the outcome of other test cases in the test run. The test case relationships are transformed into scoring results and output for the further processing.

1 Claim, 4 Drawing Sheets

Related U.S. Application Data continuation of application No. 14/792,682, filed on Jul. 7, 2015, now Pat. No. 10,176,426.

(51) Int. Cl.
G06F 16/248 (2019.01)
G06F 16/2458 (2019.01)
G06F 16/2457 (2019.01)
G06F 11/26 (2006.01)
G06F 11/36 (2006.01)
G06F 16/17 (2019.01)
G06F 16/14 (2019.01)
G06N 20/00 (2019.01)
G06N 99/00 (2019.01)

(52) U.S. Cl.
CPC ...... *G06F 11/3684* (2013.01); *G06F 11/3688* (2013.01); *G06F 11/3692* (2013.01); *G06F 16/14* (2019.01); *G06F 16/156* (2019.01); *G06F 16/17* (2019.01); *G06F 16/248* (2019.01); *G06F 16/2465* (2019.01); *G06F 16/24578* (2019.01); *G06N 7/005* (2013.01); *G06N 20/00* (2019.01); *G06N 99/00* (2013.01)

(58) Field of Classification Search
USPC .......................................................... 706/46
See application file for complete search history.

(56) References Cited

U.S. PATENT DOCUMENTS

| | | | |
|---|---|---|---|
| 8,423,226 B2 | 4/2013 | Underdal et al. | |
| 8,522,083 B1 | 8/2013 | Cohen | |
| 8,527,813 B2 | 9/2013 | Budnik et al. | |
| 9,495,642 B1 | 11/2016 | Smith | |
| 2004/0034456 A1 | 2/2004 | Felke et al. | |
| 2006/0174162 A1 | 8/2006 | Varadarajan et al. | |
| 2009/0265681 A1 | 10/2009 | Beto et al. | |
| 2009/0276663 A1 | 11/2009 | Kaksonen | |
| 2011/0145653 A1 | 6/2011 | Broadfoot | |
| 2012/0190574 A1 | 7/2012 | Johnston | |
| 2012/0266023 A1 | 10/2012 | Brown | |
| 2013/0104105 A1 | 4/2013 | Brown | |
| 2015/0242304 A1 | 8/2015 | Akbulut et al. | |
| 2017/0091624 A1 | 3/2017 | Smith | |

OTHER PUBLICATIONS

Last et al ("The Data Mining Approach to Automated Software Testing" 2003) (Year: 2003).*

Wikipedia, "Software Testing", <https://en.wikipedia.org/wiki/Software_testing>, This page was last edited on Sep. 25, 2017, 24 pages.

Chen et al.; "Test Case Prioritization in a Specification-based Testing Environment"; Journal of Software, vol. 9, No. 8, Aug. 2014; © 2014, Academy Publisher; pp. 2056-2064.

"Sorting Test Cases in Test Sequences"; SAP; © Copyright by SAP SE or an SAP Affiliate Company; Captured Mar. 2, 2015; pp. 1-2, <http://help.sap.com/saphelp_sm71_sp12/helpdata/en/59/d69400d7234665b706a6cd56a9fb46/content.htm>.

Smith et al., "Predictive Model Scoring to Optimize Test Case Order in Real Time", U.S. Appl. No. 14/792,682, filed Jul. 7, 2015, 27 pages.

Smith et al., "Predictive Model Scoring to Optimize Test Case Order in Real Time", U.S. Appl. No. 15/014,486, filed Mar. 2, 2016, 22 pages.

IBM Appendix P, list of patents or patent applications treated as related, Nov. 2, 2016, 2 pages.

* cited by examiner

PREDICTIVE MODEL SCORING TO OPTIMIZE TEST CASE ORDER IN REAL TIME

BACKGROUND OF THE INVENTION

The present invention relates generally to the field of software testing, and more particularly to identifying a sequence of test cases in a test environment.

Software testing is an investigation conducted to provide stakeholders with information about the quality of the product or service under test. Software testing can also provide an objective, independent view of the software to allow the business to appreciate and understand the risks of software implementation. Test techniques include, but are not limited to, the process of executing a program or application with the intent of finding software bugs (errors or other defects).

SUMMARY

According to an embodiment, a computer program product for predictively scoring test case results in real-time, the computer program product comprising: one or more computer readable storage media and program instructions stored on the one or more computer readable storage media, the program instructions comprising: program instructions to receive one or more test case results associated with a test run, wherein the one or more test case results comprise attributes associated with one or more test case relationships; program instructions to determine one or more test case relationships based on at least one of one or more predictive statistical models and one or more attributes, wherein predictive statistical models comprise one or more of a priori, regression, clustering, tree, and neural network, wherein the one or more predictive statistical models are operational on the one or more test case results, and wherein determining the one or more test case relationships comprises data-mining historical test results to organize related attributes statistically; program instructions to transform the one or more test case relationships into one or more scoring results based on predetermined correlation criteria, wherein predetermined correlation criteria comprise one or more of predetermined association rules and one or more predictive statistical models; and program instructions to output the one or more scoring results for further processing, wherein the one or more scoring results comprise one or more of single-value output comprising a test case for execution, multi-value output comprising a plurality of test cases and statistical correlation and confidence ranking for execution, and multi-value prioritized output comprising a prioritized plurality of test cases for execution.

DETAILED DESCRIPTION

Software testing often involves an experienced test designer defining test cases, generating a prioritized predefined sequence of the test cases and running the prioritized predefined sequence of the test cases. Sequencing of test cases is based on various factors such as, but not limited to, individual running time, perceived impact and/or feature coverage. Further, the prioritization and/or sequencing of test cases typically occurs before a test run begins and remains unaltered throughout the run.

Embodiments of the present invention, recognize an approach to utilize a real-time predictive model that both dynamically scores test results as test results are presented and re-sequences test cases in real-time based on analytics of historical results and/or intrinsic test case relationships. Embodiments of the present invention detail an approach to dynamically establish an optimized test case run sequence predictively and in real-time.

Dynamically sequencing tests during a test run can produce benefits related to testing efficiency. When focusing on a class of test results, such as test case failures, one benefit of these embodiments is the predictive model searches historic test result attributes (data mining), uses statistical model rules to find a best fit trend from test case result attributes and predicts the next test case likely to fail. The prediction allows for optimized test case sequencing, assists in uncovering failures faster and reducing the required time for a test engineer to receive test run feedback. Collecting test failure information as quickly as possible enables rapid failure diagnostics by programmers and/or developers.

Embodiments of the present invention will now be described in detail with reference to the figures.

Figure 1:
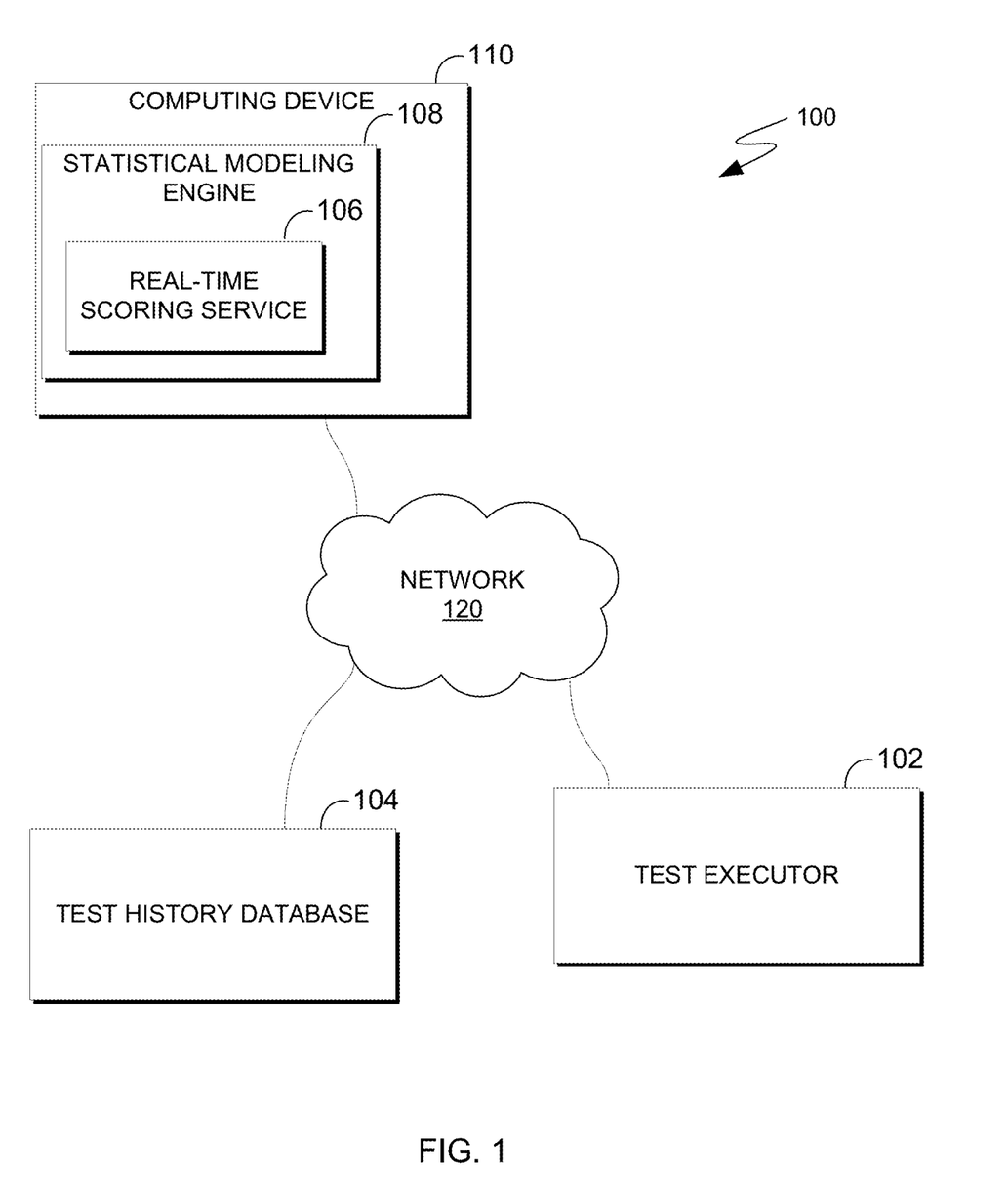
FIG. 1 is a functional block diagram illustrating a distributed data processing environment, in accordance with an embodiment of the present invention.

FIG. 1 depicts a block diagram of computing test system 100, in accordance with one embodiment of the present invention. Elements of computing test system 100 comprise a real-time scoring service 106, residing in a statistical modeling engine 108, as a real-time decision source for test executor 102. Further, statistical modeling engine 108 is operational on computing device 110. It should be noted that FIG. 1 provides an illustration of one embodiment and does not imply any limitations with regard to other environments in which different embodiments are implemented, e.g., real-time scoring service 106 can exist as a component separate from statistical modeling engine 108 on computing device 110 or as component on a separate computing device (not shown) communicatively connected to statistical modeling engine 108 via network 120.

In the depicted embodiment of computing test system 100, test history database 104 and test executor 102 are illustrated to establish a framework in which real-time scoring service 106 operates. It should be noted that various embodiments of real-time scoring service 106 can include one or more associated test executors 102 and one or more test history databases 104. Further, real-time scoring service 106 is contained in a statistical modeling engine 108, of which there can be one or more statistical modeling engines 108 in various embodiments of the present invention.

In the depicted embodiment, components in the computing test system 100 are communicatively connected via a network 120. The network 120 can be a local area network (LAN), a wide area network (WAN) such as the Internet, a cellular data network, any combination thereof, or any combination of connections and protocols that will support communications between statistical modeling engine 108, real-time scoring service 106, test history database 104, and test executor 102, in accordance with embodiments of the invention. The network 120 can include wired, wireless, or fiber optic connections. Statistical modeling engine 108, real-time scoring service 106, test history database 104, and test executor 102 can include additional computing devices, servers, or other devices not shown.

In the depicted embodiment, FIG. 1 includes test history database 104 for storing historic test data and related attributes. Test history database 104 is read and writable by test executor 102 and readable by real-time scoring service 106. In other embodiments, real-time scoring service 106 can write to test history database 104.

Continuing with the embodiment, test executor 102 runs a set of tests on a range of platforms, such as, but not limited to, operating system platforms. In doing so, test executor 102 monitors and manages workload on a test platform (not depicted). Test executor 102 runs a test on a platform and records the results into test history database 104. In one embodiment, when a test fails, test executor 102 sends information about the test toward real-time scoring service 106; when a test succeeds, test executor 102 continues cycling through tests under test executor 102 control. In other embodiments, test executor 102 can communicate test results to real-time scoring service 106 regardless of the outcome of a test case.

Further, test executor 102 manages a set of tests to run on a set of platforms, such as, but not limited to, operating system platforms. In doing so, test executor 102 processes a predetermined sequence of tests. Test executor 102 will step through each test case until a run is complete. For each completed test case, test executor 102 can provide real-time scoring service 106 the test case results. Test executor 102 results can include but are not limited to, test case ID, test run ID and test outcome. In other embodiments, a set of test cases will be included in a grouping termed a "bucket" and a series of "buckets" constitute a test run. Test executor 102 processes an initially defined sequence of buckets. Test executor 102 will step through each test case in a bucket until the bucket is complete and record either individual test case results or bucket results as an aggregate to test history database 104. When each test case or bucket is completed, test executor 102 can provide real-time scoring service 106 with test results. Test executor 102 results can include but is not limited to, bucket ID, test case ID, test run ID and test outcome. Next, test executor 102 receives scoring results from real-time scoring service 106 which test executor 102 then uses to determine the next action in a test environment.

Test history database 104 is a repository that could be written to and/or read by test executor 102. In some embodiments, additional functionality (not shown) allows an administrator or other privileged user to store test results and/or information about previous test runs.

Real-time scoring service 106, allows an administrator or other privileged user to define or configure which statistical models and rules are used by real-time scoring service 106. Model and rule maintenance of real-time scoring service 106 can vary among implementations and is not depicted.

Figure 2:
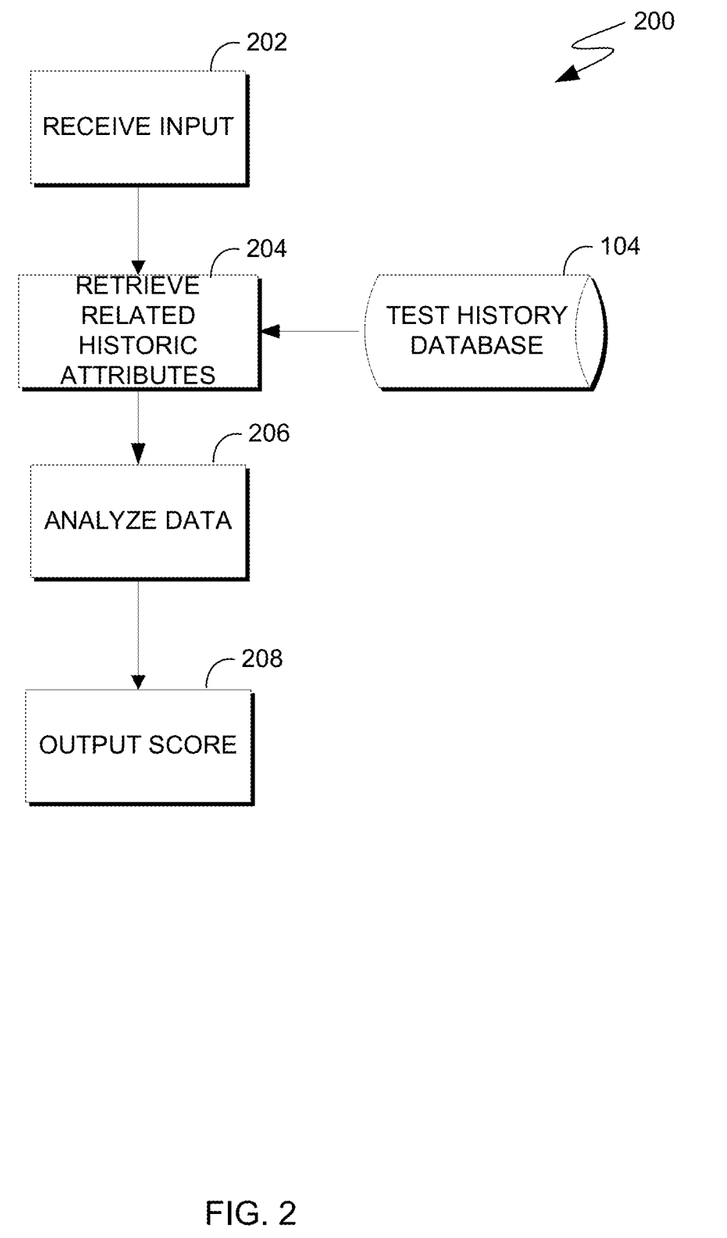
FIG. 2 depicts a flow of the steps of a real-time predictive scoring service, in accordance with an embodiment of the present invention.

FIG. 2 depicts a flowchart 200 of the steps of real-time scoring service 106, utilizing predictive analytics technology. The scoring service 106 will predict the likely outcome of a series of test cases, in accordance with an embodiment of the present invention.

In step 202, real-time scoring service 106 receives input sent by test executor 102, the input contains test result information from a completed test case/bucket within a test run to allow real-time scoring service 106 to utilize statistical modeling engine 108 to retrieve the best match of related test cases/buckets. It should be noted that test executor 102 results can include but are not limited to, bucket ID, test case ID, test run ID and test outcome.

In step 204, real-time scoring service 106 uses completed test case information provided by test executor 102 to query test history database 104 for use in subsequent analysis. It should be noted that an initial test run may contain no history and real-time scoring service 106 modeling rules can be configured by an administrator accordingly.

In step 206, real-time scoring service 106 uses scoring rules and statistical methods to score test cases within a test run based on input received in step 202. Example predictive scoring models include but are not limited to, a priori, regression, clustering, tree, and neural network. The complexity of data retained in test history database 104 and the complexity of the data attributes analyzed can vary depending on implementation needs of test executor 102. Example data attributes include, but are not limited to, test run id, test case id, result, bucket id, run time, and associated include file. Generally, real-time scoring service 106 uses an analytical model to find related test cases that statistically share common attributes and thereby will realize similar testing outcome as the test associated with the input received in step 202.

Continuing with step 208, real-time scoring service 106 sends output toward test executor 102, the output contains information test executor 102 uses to determine the next action to take in a test environment. In some embodiments, real-time scoring service 106 provides all test cases in a run regardless of whether they have been completed. In other embodiments, real-time scoring service 106 limits output to include those test cases that have not been executed in a test run. In other embodiments, real-time scoring service 106 output can include a single-value next test case to run based on highest statistical correlation and confidence ranking. Further, real-time scoring service 106 output can include probabilistic correlation and confidence ranking for test executor 102 use. It should be noted that the above referenced output embodiments are based on and limited to input requirements of test executor 102 as real-time scoring service 106 provides output to meet data format and input needs of test executor 102.

Embodiments of the present invention support a range of simple to complex inputs and outputs of the predictive model. Real-time scoring service 106 can provide a single-value next Bucket result or an array of Buckets result with or without statistical weights for the test executor 102 to process. All input and output format variations are implementation decisions and not constrained by the predictive analytics embodiments of the present invention.

Figure 3A:
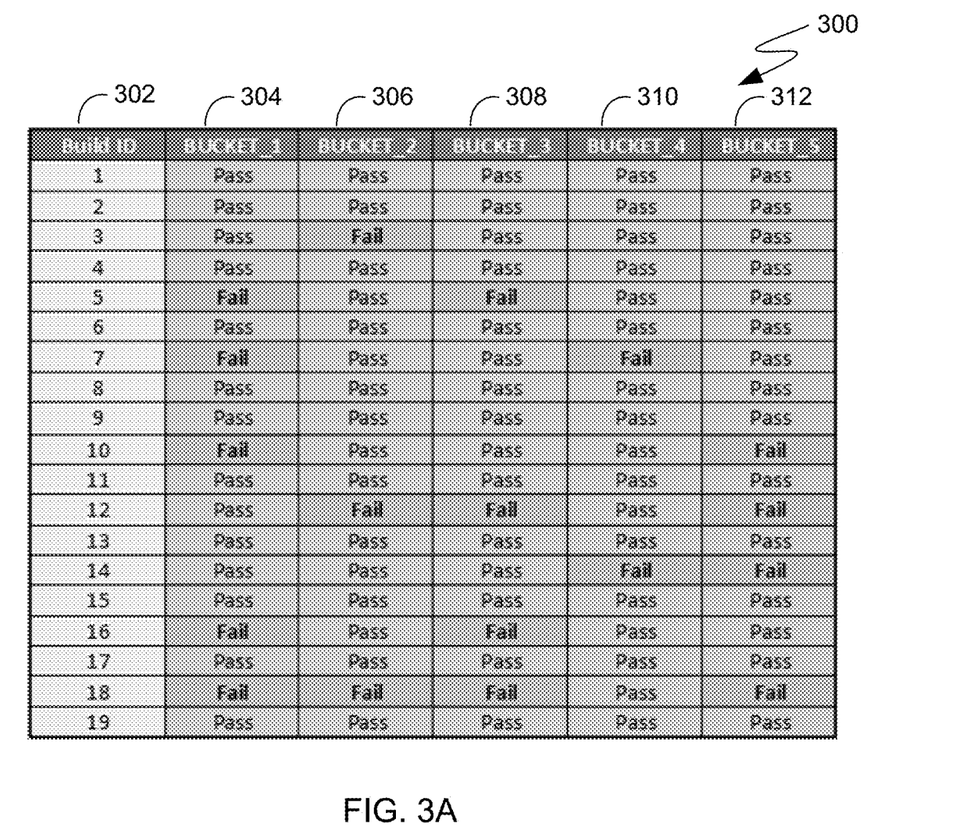
FIG. 3A-B depicts an example of sample test history used by a real-time predictive scoring service and sample test history provided by a real-time predictive scoring service, respectively, in accordance with an embodiment of the present invention.

FIG. 3A depicts a table of sample test history 300 created by test executor 102 and used by real-time scoring service 106 for analysis. Test history 300 represents one aspect of test history data that can be found in test history database 104. Heading Build ID 302 is an identifier of historic test runs. Each test run depicts test results, indicated by heading Bucket n, where 'n' indicates one to many possible buckets. In this example there is one Build ID 302 and are 5 test buckets 304, 306, 308, 310, 312 per test run.

Figure 3B:
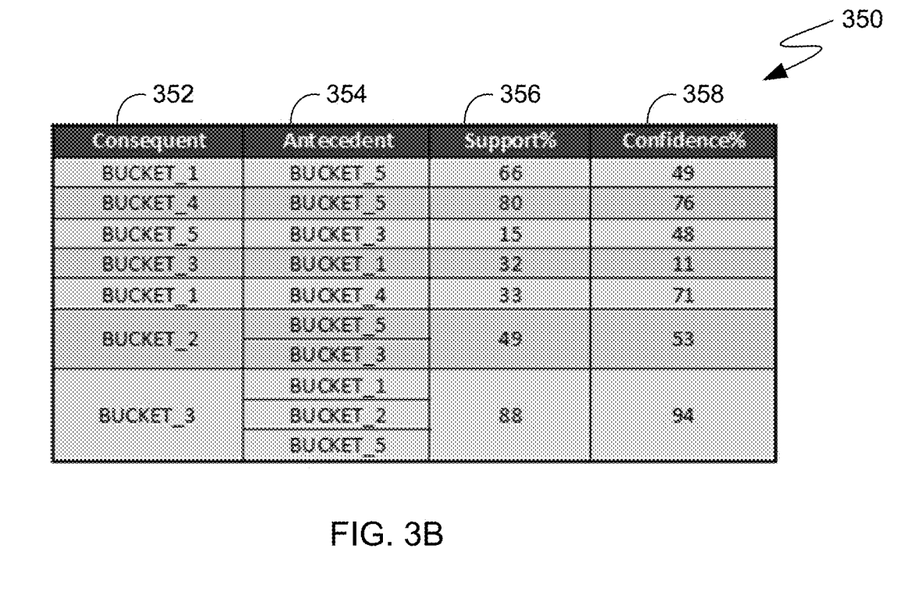

FIG. 3B, table 350 represents an example of an analytical transformation performed by real-time scoring service 106. Table 350 data represents what real-time scoring service 106 will produce during analysis of test history data in table 300 by applying an a priori association model and keyed on test buckets 304, 306, 308, 310, 312 value equal to 'Fail'. The analysis results, in the column labeled "Consequent" 352, indicates a predicted Bucket failure when a Bucket of interest in column labeled "Antecedent" 354 fails. For example, if real-time scoring service 106 is provided with BUCKET_4 (Antecedent 354) result of 'Fail' as input from test executor 102 then real-time scoring service 106 will predict BUCKET_1 (Consequent 352) will fail when BUCKET_1 testing is executed.

Further, table 350 contains columns labeled "Support %" 356 and "Confidence %" 358 which are statistical facets of the analytical model used and indicate statistical correlation and confidence ranking of the relative associations between Buckets. For example, if real-time scoring service 106 is provided with BUCKET_3 (Antecedent 354) result of 'Fail' as input from test executor 102 then BUCKET_2 (Consequent 352) has a higher probability to Fail than BUCKET_5 (Consequent 352); due to "Support %" 356 equal to 49% and "Confidence %" 358 equal to 53% versus "Support %" 356 equal to 15% and "Confidence %" 358 equal to 48% respectively. In the above example, real-time scoring service 106 is able to prioritize and/or score relationships to be used by test executor 102.

Figure 4:
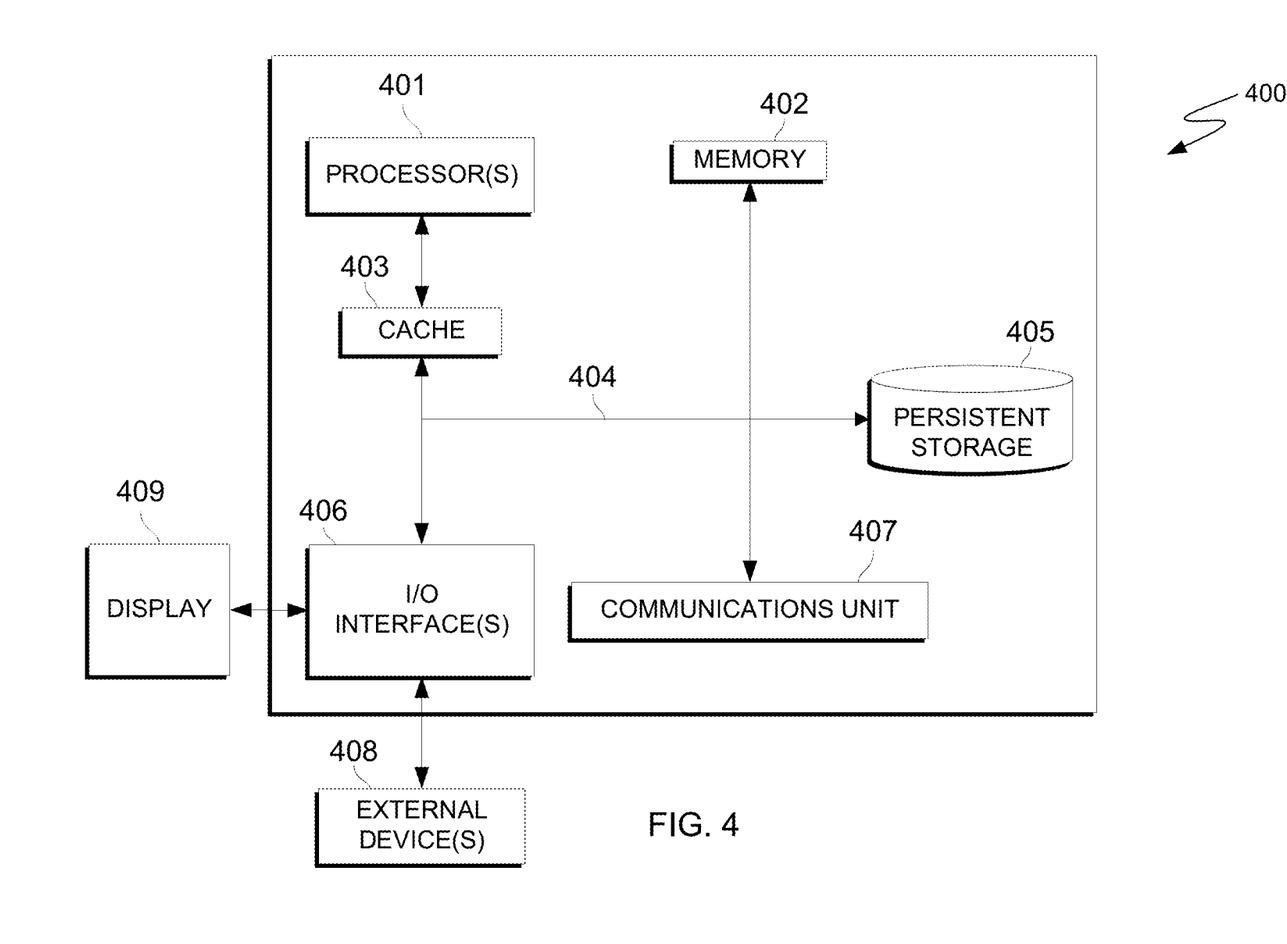
FIG. 4 depicts a block diagram of components of a server and/or a computing device, in accordance with an embodiment of the present invention.

FIG. 4 depicts a block diagram of components of computing device 110 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer system 400 includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for predictively scoring test case results in real-time, the computer program product comprising:
   one or more computer readable storage media and program instructions stored on the one or more computer readable storage media, the program instructions comprising:
   program instructions to receive one or more test case results associated with a test run, wherein the one or more test case results comprise attributes associated with one or more test case relationships;
   program instructions to determine one or more test case relationships based on at least one of one or more predictive statistical models and one or more attributes, wherein predictive statistical models comprise one or more of a priori, regression, clustering, tree, and neural network, wherein the one or more predictive statistical models are operational on the one or more test case results, and wherein determining the one or more test case relationships comprises data-mining historical test results to organize related attributes statistically;
   program instructions to transform the one or more test case relationships into one or more scoring results based on predetermined correlation criteria, wherein predetermined correlation criteria comprise one or more of predetermined association rules and one or more predictive statistical models; and program instructions to output the one or more scoring results for further processing, wherein the one or more scoring results comprise one or more of single-value output comprising a test case for execution, multi-value output comprising a plurality of test cases and statistical correlation and confidence ranking for execution, and multi-value prioritized output comprising a prioritized plurality of test cases for execution.

\* \* \* \* \*